(12) United States Patent
Sofer et al.

(10) Patent No.: US 6,925,299 B1
(45) Date of Patent: Aug. 2, 2005

(54) SYSTEM AND METHOD FOR PROVIDING ACCESS TO VALUE ADDED SERVICES FOR ROAMING USERS OF MOBILE TELEPHONES

(75) Inventors: Carmel Sofer, Mevaseret Zion (IL); Shlomo Wolfman, Hod Hasharon (IL)

(73) Assignee: StarHome GmbH, Zurich (CH)

( * ) Notice: Subject to any disclaimer, the term of this patent is extended or adjusted under 35 U.S.C. 154(b) by 0 days.

(21) Appl. No.: 09/674,639

(22) PCT Filed: May 5, 1999

(86) PCT No.: PCT/IL99/00235

§ 371 (c)(1),
(2), (4) Date: Jan. 8, 2001

(87) PCT Pub. No.: WO99/57914

PCT Pub. Date: Nov. 11, 1999

(51) Int. Cl.[7] .............................................. H04M 3/42
(52) U.S. Cl. ................. 455/414.2; 455/413; 455/414.1; 455/412.1; 455/445
(58) Field of Search .......................... 455/411, 413–417, 455/432–433, 435, 445, 412.1, 412.2, 426; 379/67.1, 88.18, 88.22, 219, 229–230

(56) References Cited

U.S. PATENT DOCUMENTS

| | | | | |
|---|---|---|---|---|
| 5,313,515 A | * | 5/1994 | Allen et al. ................. | 455/413 |
| 5,329,573 A | | 7/1994 | Chang et al. | |
| 5,497,373 A | * | 3/1996 | Hulen et al. ................. | 370/259 |
| 5,504,804 A | | 4/1996 | Widmark et al. | |
| 5,506,888 A | * | 4/1996 | Hayes et al. ................. | 455/445 |
| 5,588,042 A | * | 12/1996 | Comer ......................... | 455/413 |
| 5,668,875 A | * | 9/1997 | Brown et al. ................ | 380/248 |
| 5,734,700 A | * | 3/1998 | Hauser et al. ............... | 455/413 |
| 5,745,852 A | | 4/1998 | Khan et al. | |
| 5,751,792 A | | 5/1998 | Chau et al. | |
| 5,815,810 A | | 9/1998 | Gallant et al. | |
| 5,867,788 A | | 2/1999 | Joensuu | |
| 5,889,839 A | * | 3/1999 | Beyda et al. ............. | 379/88.12 |
| 5,898,922 A | | 4/1999 | Reininghaus | |
| 5,910,946 A | * | 6/1999 | Csapo ........................ | 370/328 |
| 5,943,619 A | * | 8/1999 | Coyne et al. ................ | 455/433 |
| 5,978,679 A | * | 11/1999 | Agre .......................... | 455/442 |
| 6,014,559 A | * | 1/2000 | Amin ......................... | 455/413 |
| 6,069,888 A | * | 5/2000 | LaRocca ..................... | 370/342 |
| 6,130,883 A | * | 10/2000 | Spear et al. ................. | 370/328 |
| 6,178,337 B1 | * | 1/2001 | Spartz et al. ............... | 455/561 |
| 6,181,695 B1 | * | 1/2001 | Curry et al. ................ | 370/356 |
| 6,188,887 B1 | * | 2/2001 | Joong et al. ................ | 455/417 |
| 6,208,638 B1 | * | 3/2001 | Rieley et al. ............... | 370/354 |
| 6,226,373 B1 | * | 5/2001 | Zhu et al. .............. | 379/207.02 |
| 6,243,374 B1 | * | 6/2001 | White et al. ................ | 370/352 |
| 6,317,484 B1 | * | 11/2001 | McAllister ............... | 379/88.02 |
| 6,337,977 B1 | * | 1/2002 | Ranta ......................... | 455/413 |
| 6,385,195 B2 | * | 5/2002 | Sicher et al. ............... | 370/356 |
| 6,445,694 B1 | * | 9/2002 | Swartz ........................ | 370/352 |
| 6,463,144 B1 | * | 10/2002 | Dunn et al. ............. | 379/210.01 |

OTHER PUBLICATIONS

Global Systems for Mobile Communications, Digital Cellular Telecommunications System (Phase 2+); Customized Applications for Mobile Network Enhanced Logic (CAMEL); Service Definition (Stage 1) (GSM 02.78 Version 5.2.1), Jul. 1997, European Telecommunications Standards Institute.

* cited by examiner

*Primary Examiner*—William Trost
(74) *Attorney, Agent, or Firm*—G. E. Ehrlich (1995) Ltd.

(57) ABSTRACT

A system for providing a roaming subscriber with access to services available in a first telephone network, when the subscriber is roaming in a second telephone network, includes a packet-switched network connecting the first telephone network with the second telephone network. Signals required for the services are transmitted between the first telephone network and the second telephone network via the packet-switched network.

35 Claims, 10 Drawing Sheets

SYSTEM AND METHOD FOR PROVIDING ACCESS TO VALUE ADDED SERVICES FOR ROAMING USERS OF MOBILE TELEPHONES

FIELD OF THE INVENTION

The present invention relates to communication systems in general and to value added services such as voice mail in particular.

BACKGROUND OF THE INVENTION

Mobile telephone operators around the world have built an international "network of networks". A subscriber to a particular mobile network can receive calls when roaming in a visited mobile network. This is shown in FIG. 1, to which reference is now made, which is schematic illustration of a prior art communication system which enables roaming. The communication system comprises a home mobile network (HMN) 10 and a visited mobile network (VMN) 12 connected by a telephone infrastructure 14. A mobile telephone 16 belonging to a user that has subscribed to the HMN 10 is roaming in the VMN 12. The HMN 10 comprises a mobile switch center (MSC) 18, a home location register (HLR) 20 and a short message service center (SMSC) 22. Similarly, the VMN 12 comprises an MSC 18', a visited location register (VLR) 24 and an SMSC 22'. The HMN 10 is connected to a voice mail system (VMS) 26.

When the mobile telephone 16 is turned on in the VMN 12, the mobile telephone 16 registers itself in the VLR 24, which notifies the HLR 20 via the telephone infrastructure 14 that the mobile telephone 16 is accessible via the MSC 18'. When the HMN 10 receives a call for the mobile telephone 16, its MSC 18 interrogates the HLR 20 and transfers the call over the telephone infrastructure 14 to the MSC 18 of the VMN 12, which transfers the call to the mobile telephone 16.

If the mobile telephone 16 is turned off or busy, the incoming call to the MSC 18 is forwarded to the VMS 26, where a message may be recorded. In the event of a message recorded in the voice mailbox of the VMS 26 for the mobile telephone 16, the VMS 26 sends a standard notification to the SMSC 22. There are a number of problems with notifying the roaming mobile telephone 16 that a message has been recorded in the VMS 26 and with enabling the mobile telephone 16 to retrieve the message.

One problem is that the notification is not always transferred successfully to the VMN 12. For example, if the HMN 10 and VMN 12 are not both Global System for Mobile communication (GSM) networks, then it may not be technically possible to transfer the notification. As a further example, the telephone infrastructure 14 may block notifications for technical or commercial reasons.

Another problem is that even if the mobile telephone 16 receives the notification, the short code that the user of the mobile telephone 16 dials in order to access the voice mailbox while in the HMN 10 is generally irrelevant in the VMN 12. For example, if the user accesses the voice mailbox directly by dialing '634' while in the HMN 10, dialing "634" while in the VMN 12 does not enable the user to access the voice mailbox. Therefore, the user must call the HMN 10 using a full international number (14 digits when calling direct, 35 digits when using "call back" services). The user then has to dial the voice mailbox number and password (an additional 4 to 10 digits). It is unlikely that the user will complete this complex long dialing procedure correctly. It is also unlikely that the user will try again after failing the first time. Another contributing factor to the failure of the long dialing procedure is that dial tone multi-frequency (DTMF) signals are transmitted with low quality over international telephone lines. In principle, it is possible to eliminate the dialing of the voice mailbox number and password by using the calling line identification (CLI) of the mobile telephone 16 to identify which voice mailbox to use, but the CLI is also not always transmitted successfully over international telephone lines.

Even when the roaming user succeeds in accessing the voice mailbox and retrieving the message, the user pays expensive international telephone rates. For this reason, most roaming users do not retrieve their voice mail messages, and many corporations even instruct their employees not to retrieve voice mail messages while roaming. This leads to a loss of service to the users and to a loss of income to the mobile network operators.

U.S. Pat. No. 5,751,792 to Chau et al. describes a system and method for providing a message system subscriber with a roaming mailbox. The messages in the home mailbox are transferred to a temporary roaming mailbox at a roaming node. According to Chau, the visited mobile network (VMN) must either have a dedicated voice mail system (VMS) for roaming users or must allocate temporary mailboxes in the existing VMS of the VMN. There may not be room available in the existing VMS for allocation of temporary mailboxes. It is not clear when to delete an allocated temporary mailbox. Furthermore, mailboxes cost the VMN money and it may be complicated for the VMN to be reimbursed for this cost. The user will have to contend with an unfamiliar way to access and work with voice mail messages.

The European Telecommunications Standards Institute (ETSI) has set a new GMS standard called Customized Application of Mobile Enhanced Logic (CAMEL). The standard specifies all the components needed to let GSM network operators offer the Intelligent Network (IN) services they supply in their home country to customers that roam on foreign networks. A major disadvantage to CAMEL is that it requires an upgrade to the installed mobile network. This is an expensive and time-consuming procedure. Moreover, CAMEL-compatible components are not yet commercially available. Furthermore, non-GSM networks are not able to use CAMEL to offer IN services to roaming subscribers.

SUMMARY OF THE INVENTION

The present invention provides a novel system and method for providing access to value added services such as voice mail services for roaming users of mobile telephones that overcomes the disadvantages of the prior art.

There is provided, in accordance with a preferred embodiment of the present invention, a system for providing a roaming subscriber with access to services available in a first telephone network. The subscriber is roaming in a second telephone network. The system includes a packet-switch network connecting the first telephone network with the second telephone network, wherein signals required for the services are transmitted between the first telephone network and the second telephone network via the packet-switch network.

Moreover, in accordance with a preferred embodiment of the present invention, the first and second telephone networks are from a group including: a mobile telephone network, a fixed telephone network, a Global System for Mobile communications (GSM) network, a Time Division Multiple Access (TDMA) network, a Code Division Multiple Access (CDMA) network, an IS-41 network, and a private branch exchange (PBX).

Furthermore, in accordance with a preferred embodiment of the present invention, the system further includes a passive System Signaling Number 7 (SS7) monitor for monitoring SS7 signals and triggering the provision of access to at least one of the services when one of a group of predetermined SS7 signals has been detected.

Moreover, in accordance with a preferred embodiment of the present invention, the predetermined SS7 signals are Mobile Application Part (MAP) messages.

Furthermore, in accordance with a preferred embodiment of the present invention, the messages are from a group including: short messages and location updates.

Moreover, in accordance with a preferred embodiment of the present invention, the system further includes a first service node for transmitting the signals between the first telephone network and the packet-switch network, and a second service node for transmitting the signals between the packet-switch network and the second telephone network.

Furthermore, in accordance with a preferred embodiment of the present invention, the second service node transmits dial tone multi-frequency (DTMF) signals concurrently with the creation of a voice path connecting the first telephone network with the second telephone network, and the first service node synchronizes the DTMF signals with the voice path.

Additionally, in accordance with a preferred embodiment of the present invention, the subscriber uses a short code dependent upon the location of the subscriber to access the second service node.

Moreover, in accordance with a preferred embodiment of the present invention, the first service node instructs the second service node via the packet-switch network to generate and send a short message.

Additionally, in accordance with a preferred embodiment of the present invention, the system further includes a user profile of the subscriber, the user profile comprising at least a subscriber calling line identification (CLI), wherein the subscriber CLI is required for access to the services.

Moreover, in accordance with a preferred embodiment of the present invention, the second service node receives the subscriber CLI from DTMF signals sent by the subscriber.

Alternatively, in accordance with a preferred embodiment of the present invention, the second service node receives a second CLI from the second telephone network end the second CLI is associated with the subscriber CLI.

Moreover, in accordance with a preferred embodiment of the present invention, the second service node creates a voice path connecting the second telephone network with be first telephone network using a second CLI of the second service node, and the first service node replaces the second CLI with the subscriber CLI when accessing one of the services.

Furthermore, in accordance with a preferred embodiment of the present invention, the services include voice message notification.

Additionally, in accordance with a preferred embodiment of the present invention, the services include voice message retrieval.

There is also provided in accordance with a preferred embodiment of the present invention a method for providing a roaming subscriber with access to services available in a first telephone network. The method includes the steps of connecting the first telephone network to a second telephone network using a packet-switch network, and transmitting signals for the services over the packet-switch network. The subscriber is roaming in the second telephone network.

Moreover, in accordance with a preferred embodiment of the present invention, the first and second telephone networks are from a group including: a mobile telephone network, a fixed telephone network, a Global System for Mobile communications (GSM) network, a Time Division Multiple Access (TDMA) network, a Code Division Multiple Access (CDMA) network, an IS-41 network, and a private branch exchange (PBX).

Moreover, in accordance with a preferred embodiment of the present invention, the method further includes the steps of monitoring SS7 signals and upon detection of one of a group of predetermined SS7 signals, triggering the provision of access to at least one of the services.

Furthermore, in accordance with a preferred embodiment of the present invention, the predetermined SS7 signals are Mobile Application Part (MAP) messages.

Additionally, in accordance with a preferred embodiment of the present invention, the messages are from a group including: short messages and location updates.

Moreover, in accordance with a preferred embodiment of the present invention, the method further includes the steps of transferring dial tone multi-frequency (DTMF) signals over the packet-switch network, and, concurrently with the step of transferring, creating a voice path connecting the first telephone network with the second telephone network. The method also includes the step of synchronizing the DTMF signals with the voice path.

Furthermore, in accordance with a preferred embodiment of the present invention, the method further includes the step of using a short code dependent upon the location of the subscriber to access one of the services.

Additionally, in accordance with a preferred embodiment of the present invention, the method further includes the step of accessing the services using a subscriber calling line identification (CLI) stored in a user profile of the subscriber.

Moreover, in accordance with a preferred embodiment of the present invention, the method further includes the step of receiving the subscriber CLI from DTMF signals sent by the subscriber.

Furthermore, in accordance with a preferred embodiment of the present invention, the method further includes the step of receiving a second CLI from the second telephone network, wherein the second CLI is associated with the subscriber CLI.

Additionally, in accordance with a preferred embodiment of the present invention, the method further includes the steps of creating a voice path connecting the second telephone network with the first telephone network using a second CLI, and replacing the second CLI with the subscriber CLI when accessing one of the services.

Moreover, in accordance with a preferred embodiment of the present invention, the services include voice message notification.

Furthermore, in accordance with a preferred embodiment of the present invention, the services include voice message retrieval.

BRIEF DESCRIPTION OF THE DRAWINGS

The present invention will be understood and appreciated more fully from the following detailed description taken in conjunction with the appended drawings in which.

DETAILED DESCRIPTION OF THE PRESENT INVENTION

The present invention provides a novel system and method for providing access to and enhancements of value added services to roaming users of telephones, by transferring certain signals over a packet-switch network through service nodes connected to the telephone networks. A non-limiting example of a packet-switch network is an Internet Protocol (IP) network Non-limiting examples of the telephone networks connected by the packet-switch network are mobile telephone network, feed telephone networks, Global System for Mobile communications (GSM) networks, Time Division Multiple Access (TDMA) networks, Code Division Multiple Access (CDMA) networks, IS-41 networks, and private branch exchanges. The term "roaming" is hereinbelow defined to include the case of a mobile telephone user accessing services of a private branch exchange, even when the mobile telephone user is located in the home mobile network and not exclusively in a visited mobile network.

Figure 1:
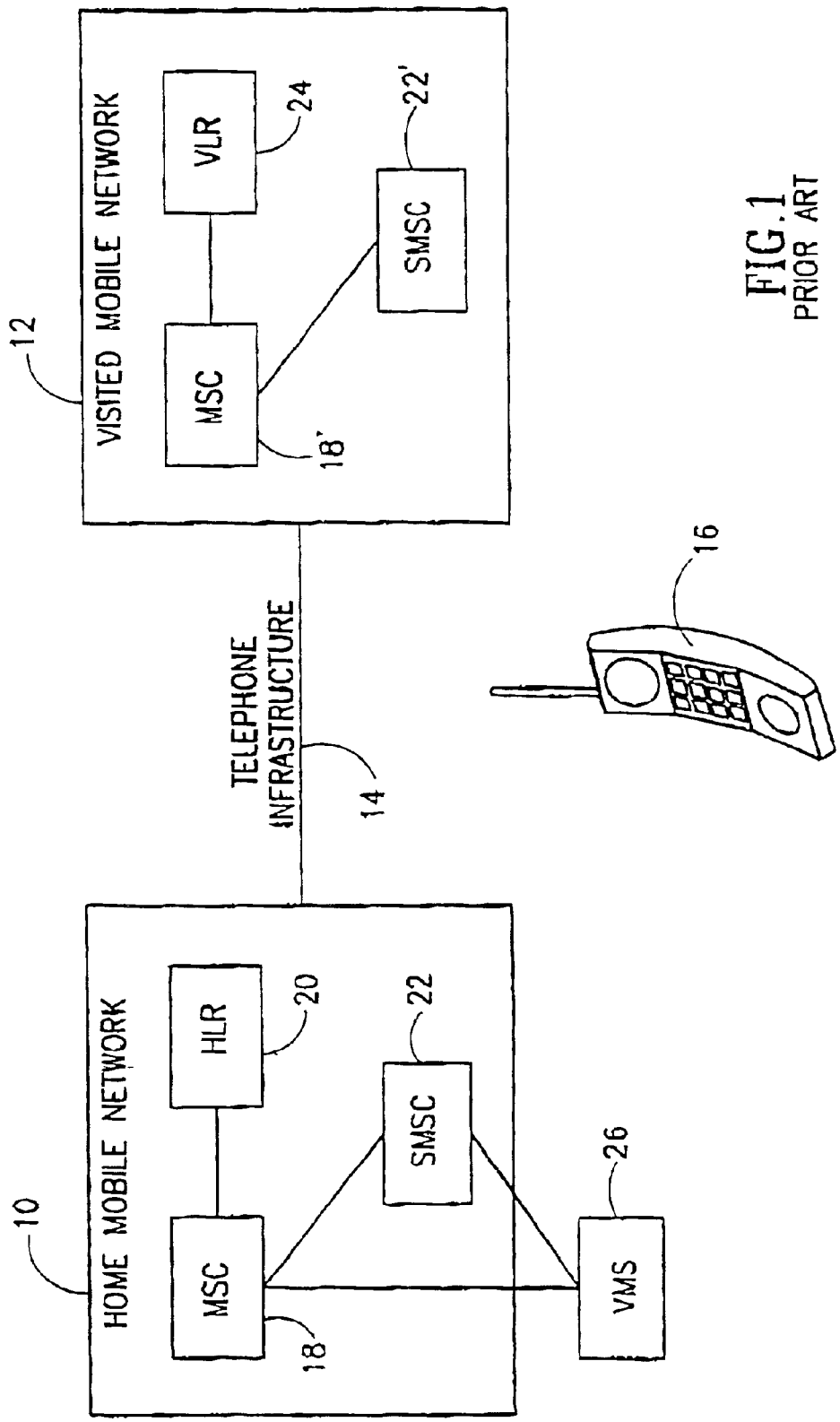
FIG. 1 is schematic illustration of a prior art communication system which enables roaming.
Figure 2:
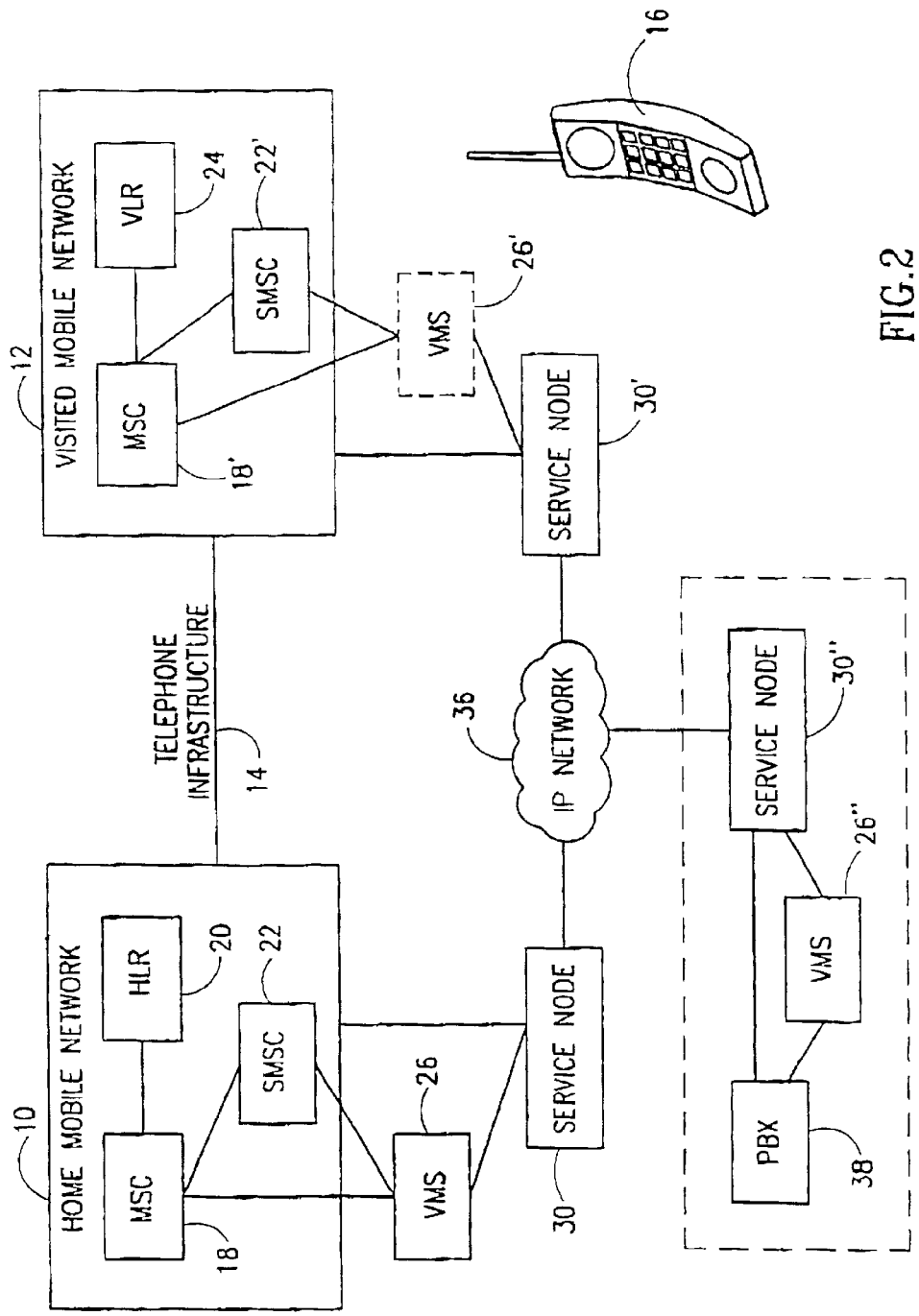
FIG. 2 is a schematic illustration of communication system according to a preferred embodiment of the present invention.

Reference is now made to FIG. 2, which is a communication system according to a preferred embodiment of the present invention. The communication system comprises the home mobile network (HMN) 10 and the visited mobile network (VMN) 12 connected by the telephone infrastructure 14. The mobile telephone 16 belonging to a user that has subscribed to the HMN 10 is roaming in the VMN 12. The HMN 10 comprises the mobile switch center (MSC) 18 and the short message service center (SMSC) 22, both of which are connected to the voice mail system (VMS) 26. The HMN 10 and the VMS 26 are both connected to a service node 30. The VMN 12 comprises the MSC 18' and the SMSC 22'. The VMN 12 is connected to a service node 30'. The service node 30 and the service node 30' are both connected to a packet-switch network, such as an IP network 36. As will be described hereinbelow, the service nodes 30 and 30, may include internal SMSCs 22 and 22 respectively. The following discussion is equally applicable to network SMSCs and internal SMSCs.

According to another preferred embodiment of the present invention, the VMN 12 is connected to a VMS 26', which is also connected to the service node 30'. The messages in the voice mailbox of the VMS 26 are transferred via the service node 30, the IP network 36 and the service node 30, to a temporary mailbox of the VMS 26'. The retrieval notification sent to the mobile telephone 16 includes a short code which when dialed gives the mobile telephone 16 access to the temporary mailbox.

In an alternative preferred embodiment, the communication system also comprises a corporate private branch exchange (PBX) 38 having a VMS 26", both of which are connected to a service node 30". The service node 30" is also connected to the IP network 36.

When a new message is recorded in the voice mailbox of the VMS 26 for the mobile telephone 16, the VMS 26 instructs the SMSC 22 to send a standard short message (SM) notification to the mobile telephone 16. As explained hereinabove, due to technical and commercial considerations, the standard SM notification does not always arrive at the mobile telephone 16. The service node 30 captures the communication between the SMSC 22 and the MSC 18 using a capture device which is a passive System Signaling Number 7 (SS7) monitor. The service node 30 sends a message over the IP network 36 to the service node 30' about the new voice mail message. The service node 30' instructs the SMSC 22' to generate a short message and send it to the mobile telephone 16. If the SMSC 22' is inaccessible or too busy, then the service node 30' uses its internal SMSC 22. If that is not possible, then the service node 30 instructs the SMSC 22 to generate the short message and send it via the telephone infrastructure to the mobile telephone 16. The short message includes the short code that enables access in the VMN 12 to the service node 30'. Alternatively, if the user profile indicates that the user receives out-dial notifications, or if the service profile of the service node 30, is such that it generally generates out-dial notifications, then the service node 30' will generate an out-dial notification to the mobile telephone 16 with the above short code. The short message or out-dial notification is sent to the mobile telephone 16.

Figure 3:
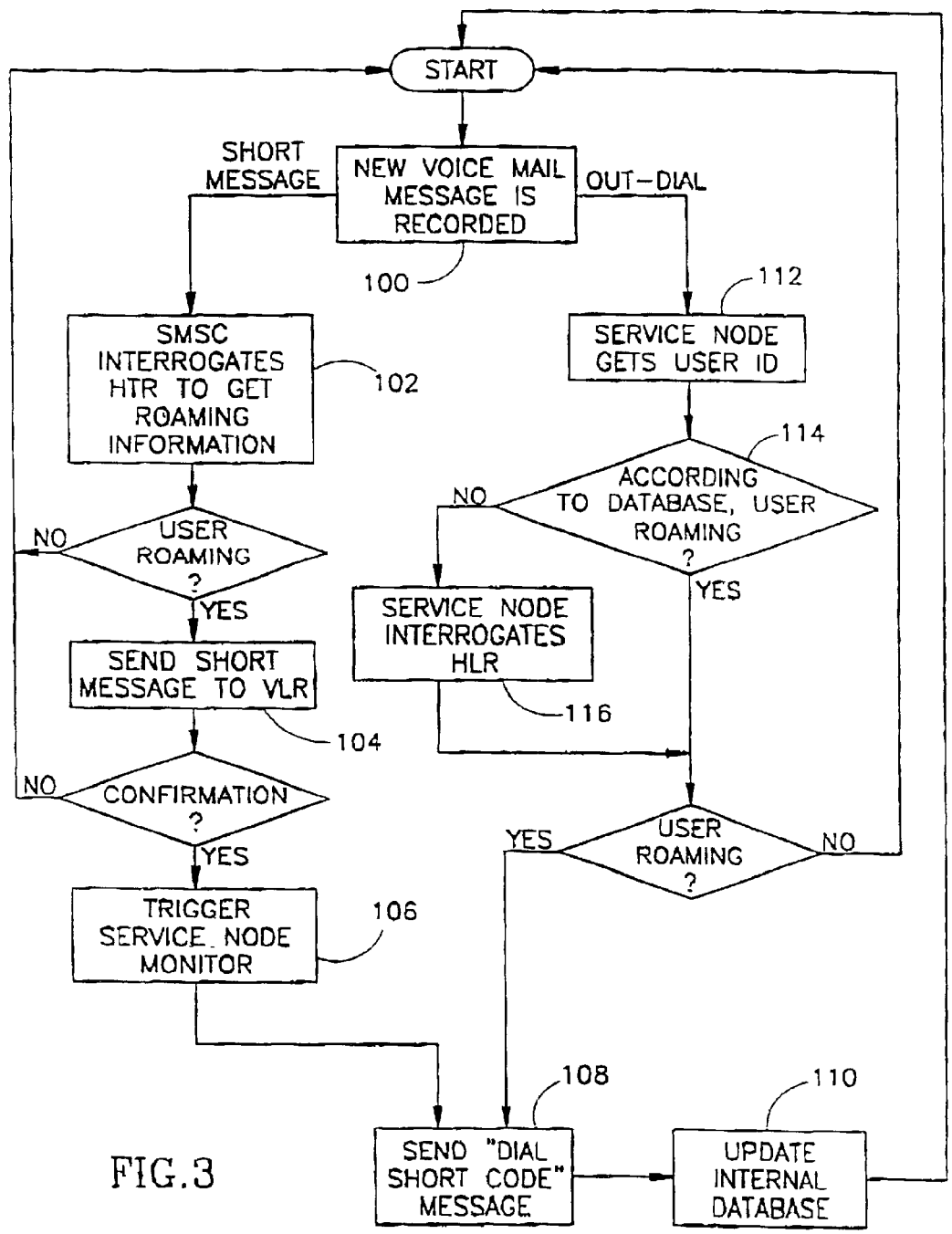
FIG. 3 is a schematic, high-level flowchart illustration of a method for voice mail notification, according to a preferred embodiment of the present invention.

The notification method is shown in the schematic, high-level flowchart 130 illustration of FIG. 3, to which reference is now made. In step 100, a new voice mail message is recorded. There are three branches to the notification method, one for short message notification, one for out-dial notification, and one for out-dial notification from the corporate voice mail. If the VMS 26 uses short message notification, then the SMSC 22 interrogates the HLR 20 to get the roaming information (step 102). If the user is roaming, the SMSC 22 sends a short message to the VLR 24 (step 104) and waits for confirmation. If a positive confirmation arrives, then the service node 30 is triggered (step 106) by the capture device. In a large network with many sites and SMSCs, the capture device will monitor the gateway MSC (i.e. the MSC that connects the network to other networks) or the HLR 20. The message listened for depends upon the device listened to, but the extracted information is the same. The service node 30 sends a "dial short code" short message to the mobile telephone 16 (step 108) and the internal database of the service node 30 is updated (step 110).

If out-dial notification is used, the service node 30 gets the user ID (step 112) from the CLI of the incoming call from the VMS 26. The service node 30 then checks its internal database to see whether the user is roaming (step 114). If the internal database does not indicate that the user is roaming, then the service node 30 interrogates the HLR 20 in order to locate the user (step 116). If the HLR 20 indicates that the user is roaming, then the service node 30 sends a "dial short code" short message to the mobile telephone 16 (step 108) and the internal database of the service node 30 is updated (step 110).

In the case of a new voice mail message in the corporate VMS 26, there is no need to check roaming, since notification is sent to the mobile telephone 16 whether or not the user is roaming. The information in the internal database is used to determine which service node sends the short message for the corporate user. The service node 30" learns of the new message in the corporate VMS 26" either by listening to the PBX out-dial notification or by some other integration method. If VLR 24 information is missing from the internal database of the service node 30, then the HLR 20 is queried for the current location of the mobile telephone 16.

It will be appreciated that the method of FIG. 3 does not necessarily involve sending a notification for each new voice mail message. The service profile or user profile may be configured to send a notification according to a different policy, for example, for each fifth new voice mail message.

Referring back to FIG. 2, in order to retrieve the messages from the voice mailbox, the user of the mobile telephone 16 dials the short code displayed in the short code notification, or presses "SEND". This is detected by the service node 30' which transfers the signals such as the calling line identification (CLI) and the dial tone multi-frequency (DTMF) signals via the (P network 36. The voice connection to the HMN 10 is made either via the telephone infrastructure 14 or using voice over IP (VoIP) technology via the IP network 36. The service node 30 receives the transferred signals and uses them to route the call to the subscriber's voice mailbox. If there is not enough information, then the service node 30 connects to the common access of the VMS 26. DTMF signals dialed by the user to access the mailbox and perform services on the mailbox are transferred throughout the call via the IP network 36.

Figure 4:
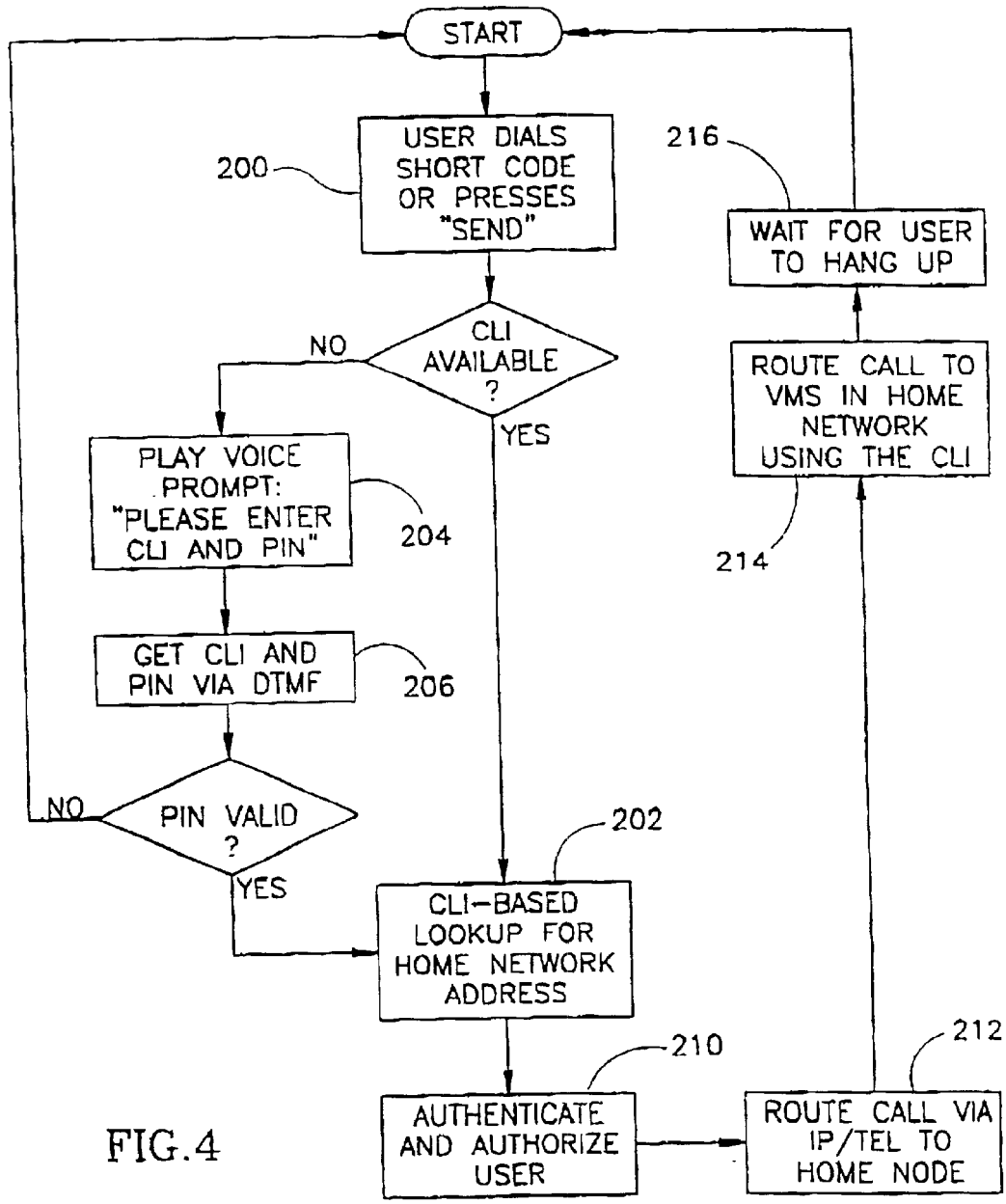
FIG. 4 is a schematic, high-level flowchart illustration of a method for voice mail message retrieval, according to a preferred embodiment of the present invention.

The voice mail message retrieval method is shown in the schematic, high-level flowchart illustration of FIG. 4, to which reference is now made. In step 200, the user dials the short code sent in the retrieval notification, or presses "SEND". If the CLI of the mobile telephone 16 is available, then the service node 30' looks up the address of the HMN 10 based on the CLI of the mobile telephone (step 202). If the CLI of the mobile telephone is not available, the service node 30' plays a voice prompt for the user to enter the subscriber CLI and Personal identification Number (PIN) (step 204). The user dials the subscriber CLI and PIN and the service node 30, determines the subscriber CLI and PIN from the DTMF signals (step 206). If the PIN is invalid, the voice mall message is not retrieved. If the PIN is valid, the service node 30' looks up the address of the HMN 10 based on the subscriber CLI (step 202).

It will be appreciated that if the subscriber is roaming with a rented mobile telephone rather than with the mobile telephone that he uses in the HMN 10, then the CLI of the rented mobile telephone will differ from the subscriber CLI. However, the user profile of the subscriber in service node 30 associates the subscriber CLI with the CLI of the rented mobile telephone.

Once the service node 30' knows the address of the HMN 10, it communicates with the HMN 10 via the service node 30 over the IP network 36, authenticating and authorizing the user of the mobile telephone 16 (step 210). Then the service node 30' routes the call from the mobile telephone 16 to the HMN 10 either via the telephone infrastructure 14 or using VOIP (step 212). It will be appreciated that this call is initiated with the CLI of the service node 30' and not with the CLI of the mobile telephone. The service node 30' sends the CLI of the mobile telephone over the IP network 36 to the service node 30. The service node 30 then uses the CLI of the mobile telephone to extract the subscriber CLI from the user profile and route the call to the VMS 26 using the subscriber CLI (step 214). The service node 30' waits for user to hang up and then releases the voice path (step 216).

Corporate voice mail retrieval is accomplished by the same method, based on user information stored in the internal database of service node 30.

Figure 5A:
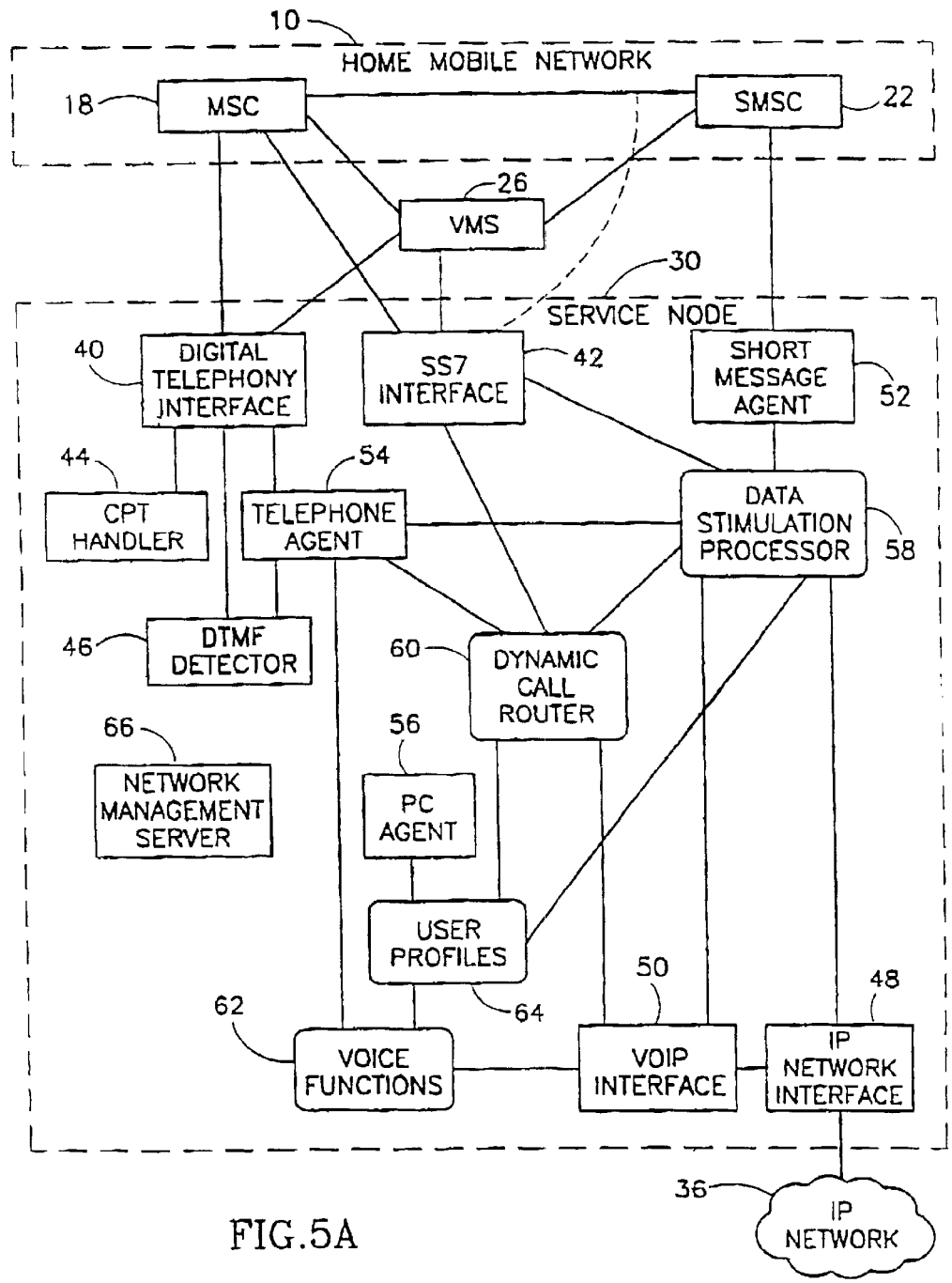
FIGS. 5A and 5B are schematic block diagram illustrations of service nodes, according to a preferred embodiment of the present invention.
Figure 5B:
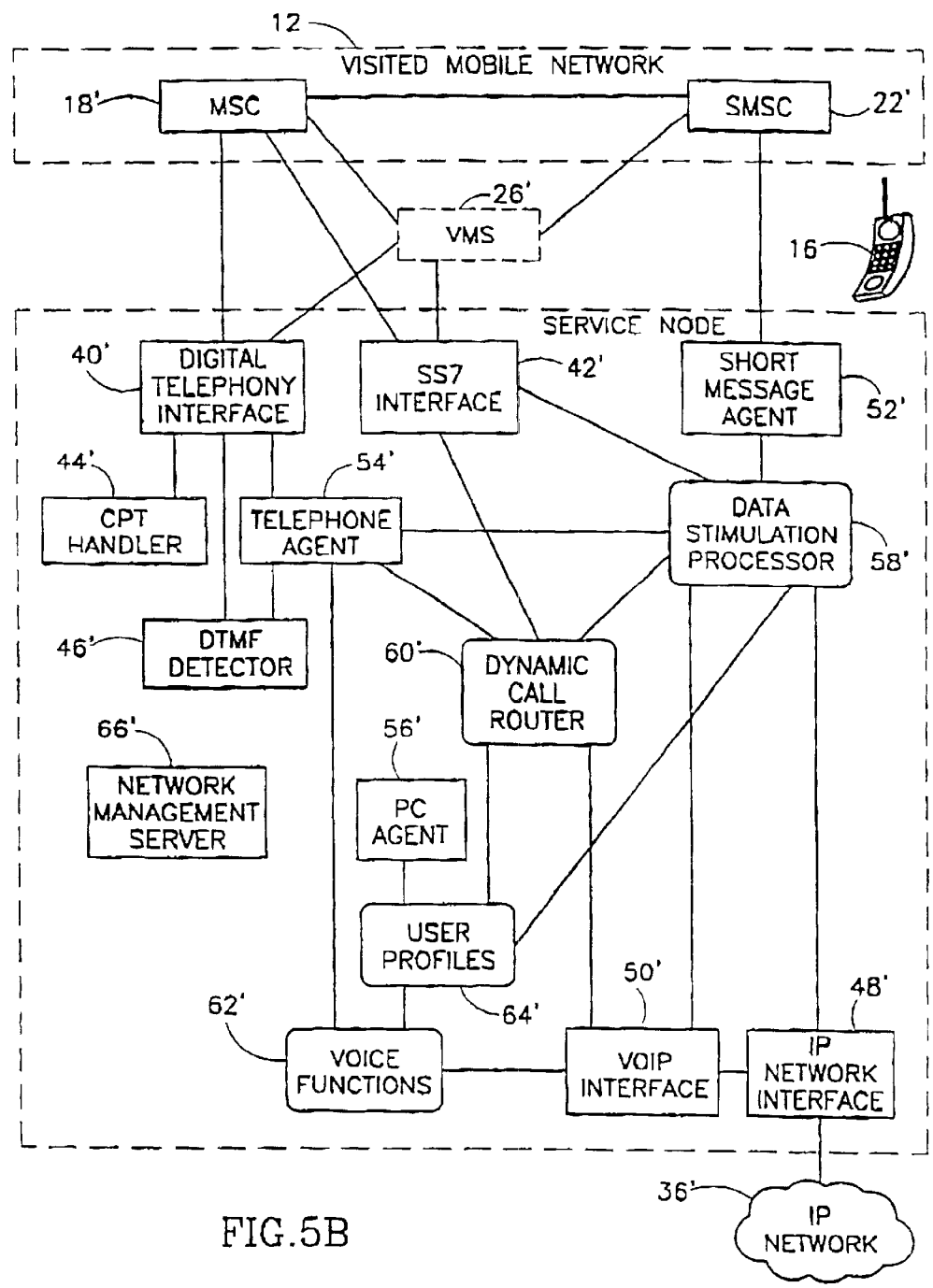

Reference is now made to FIGS. 5A and 5B, which are schematic block diagram illustrations of the service nodes 30 and 30, respectively, of FIG. 2, according to a preferred embodiment of the present invention. The service node 30 comprises a digital telephony interface (DTI) 40 and a System Signaling Number 7 (SS7) interface 42, both connected to the MSC 18 and the VMS 26. The service node 30 further comprises a CPT handler 44 and a DTMF detector 46, both connected to the DTI 40. The service node 30 also comprises an IP network Interface 48 connected to the IP network 36, and a Voice Over Internet Protocol (VOIP) interface 50 connected to the IP network interface 48.

The service node 30 also comprises a short message agent 52 connected to the SMSC 22, a telephone agent 54 connected to the DTI 40, the SS7 Interface 42 and the DTMF detector 46, and a personal computer (PC) agent 56.

The service node 30 further comprises a data stimulation processor (DSP) 58, a dynamic call router 60, a voice function unit 62, a user profile database 64, and a network management server 66. The DSP 58 is connected to the SS7 interface 42, the short message agent 52, the telephone agent 54, the VOIP interface 50 and the IP network interface 48. The dynamic call router 60 is connected to the DSP 58, the SS7 interface 42, the telephone agent 54 and the VOIP interface 50. The voice function unit 62 is connected to the telephone agent 54 and the VOIP Interface 50. The user profile database 64 is connected to the PC agent 56, the voice function unit 62, the dynamic call router 60 and the DSP 58.

The service node 30 is identical to the service node 30 and its components have the same numbers as the components of the service node 30, with the addition of a tag (') in order to differentiate between the service nodes 30 and 30'.

Figure 6:
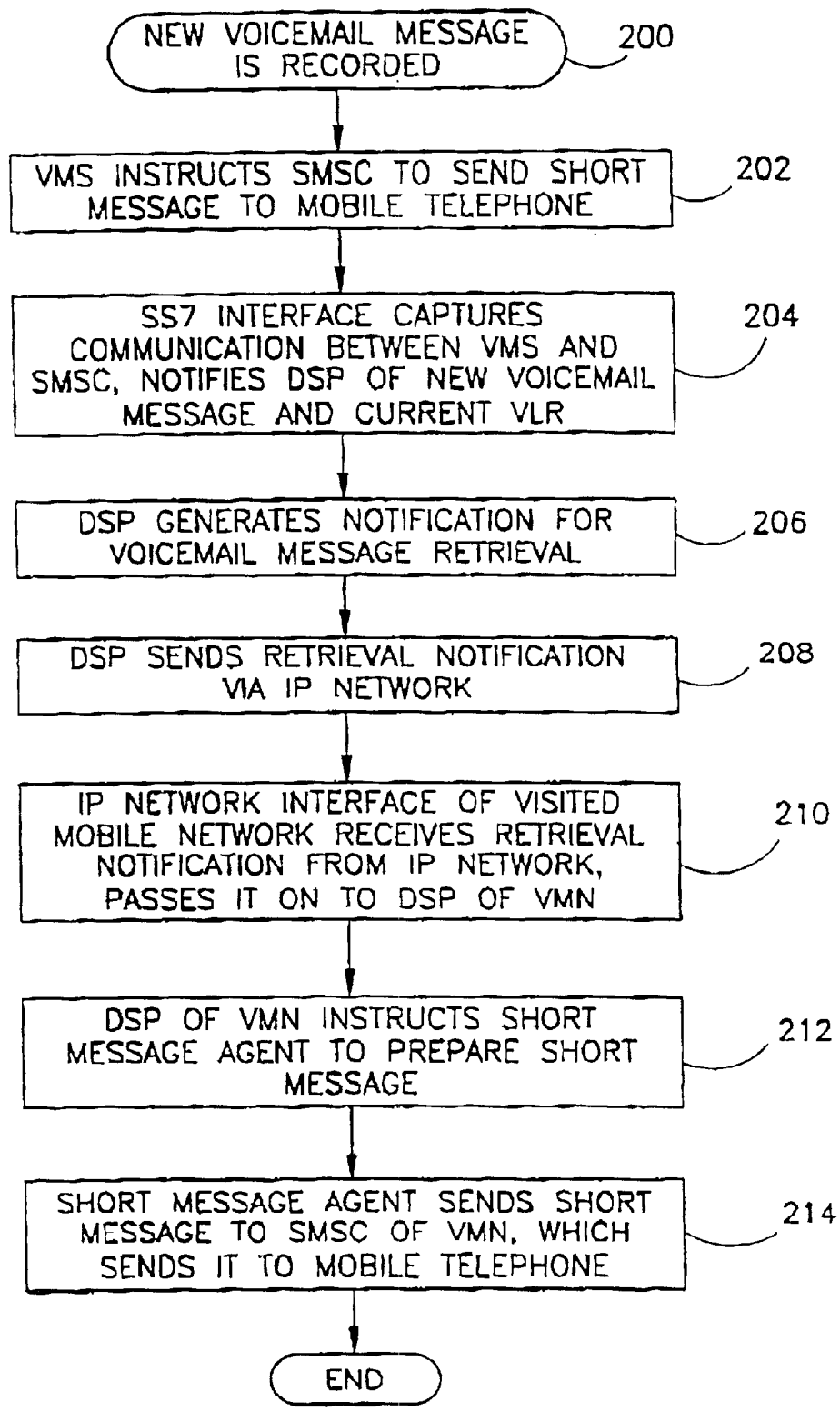
FIG. 6 is a schematic flowchart illustration of a detailed method for voice mail notification, according to a preferred embodiment of the present invention.

Reference is now made additionally to FIG. 6, which is a schematic flowchart illustration of the notification operation of the service nodes 30 and 30'. In step 400, a new voice mail message is recorded in the VMS 26. The VMS 26 instructs the SMSC 22 to send a short message to the mobile telephone 16 (step 402). The SS7 interface 42 captures the communication between the SMSC 22 and the MSC 18, and notifies the DSP 58 that a new voice mail message has been recorded and, of the current roaming location of the mobile telephone 16 (step 404). The DSP 58 generates a notification for retrieval of the voice mail message (step 406) and sends it via the IP network interface 48 over the IP network 36 to the service node 30' (step 408).

The IP network interface 48' receives the retrieval notification from the IP network 36 and passes it on to the DSP 58' (step 410). The DSP 58' instructs the short message agent 52' to prepare a short message based on the retrieval notification (step 412). The short message agent 52' sends the short message to the SMSC 22', which passes it on to the mobile telephone 16 (step 414).

At this point, the user has been notified that there is a new voice mail message and has been instructed how to retrieve it. The user may retrieve the message immediately upon receipt of the notification, or may retrieve the message later. Furthermore, the user may try to retrieve voice mail messages even without receiving a retrieval notification, by dialing the short code or pressing "SEND" for a saved short code message.

Figure 7:
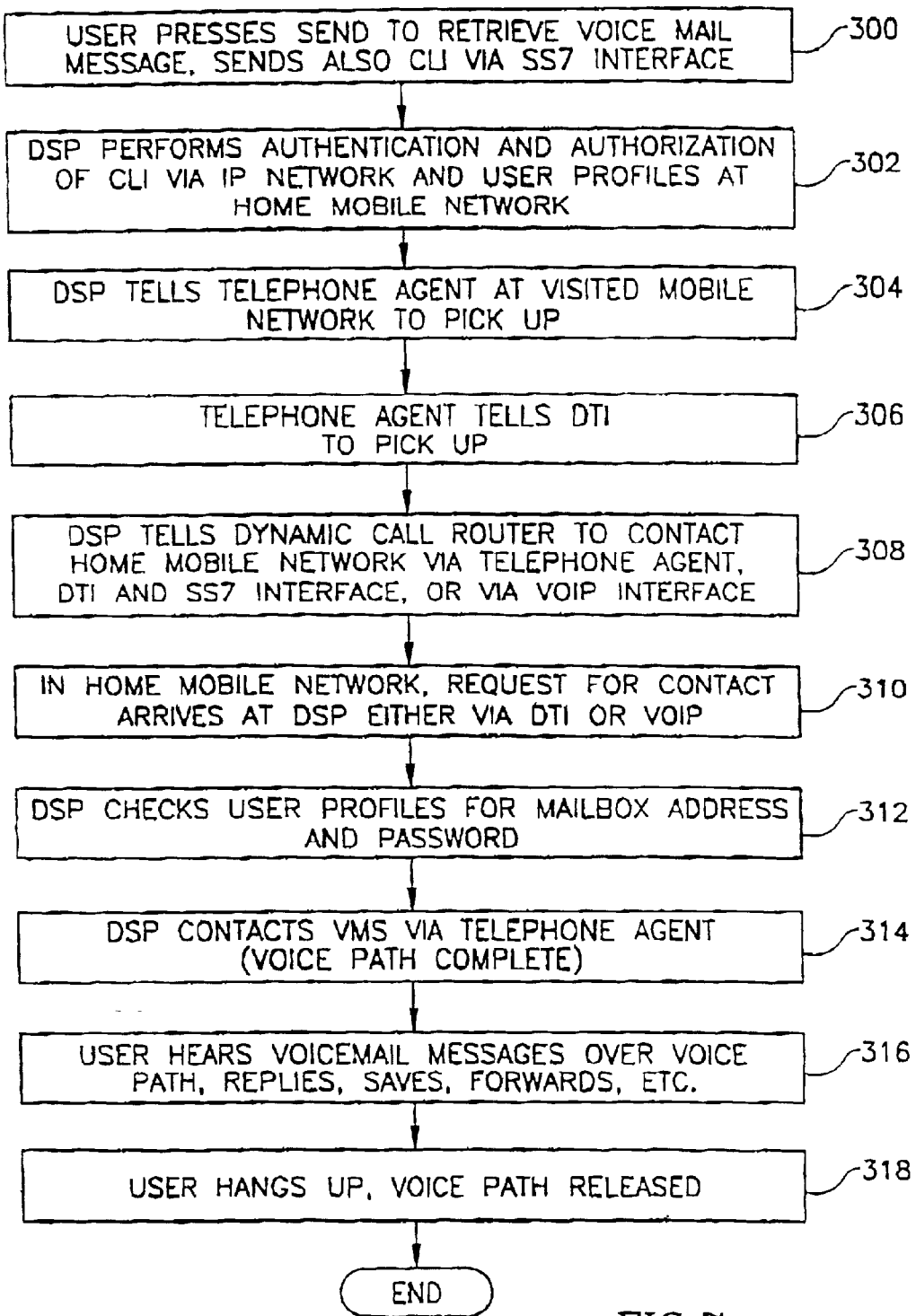
FIG. 7 is a schematic flowchart illustration of a detailed method for voice mail message retrieval, according to a preferred embodiment of the present invention.

Reference is now made additionally to FIG. 7, which is a schematic flowchart illustration of the retrieval operation of the service nodes 30 and 30'. The user presses "SEND" in order to retrieve the voice mail message, thereby sending also the CLI via the SS7 interface 42' (step 300). The DSP 58' performs authentication and authorization of the CLI via the IP network 36 (step 302). This involves sending the CLI via the IP network interface 48' over the IP network 36 to the IP network interface 48 and to the DSP 58, which checks the user profiles database 64 for authentication and authorization. The DSP 58 then sends a confirmation back to the DSP 58' over the IP network 35.

In the event that the CLI is not transmitted or successfully received, the service node 30' opens an interactive Voice Response (IVR) session with the user to ask for the CLI and PIN in order to authenticate, authorize and retrieve the user profile.

Once the CLI has been authenticated and the voice mail message retrieval authorized, the DSP 58' instructs the telephone agent 54' to pick up (step 304). The telephone agent 54' instructs the DTI 40' to pick up (step 306). Concurrently with steps 304 and 306, the DSP 58' instructs the dynamic call router 60' to contact the HMN 10 to create a voice path (step 308). The voice path may use the existing telephone infrastructure 14, in which case the dynamic call router 60' contacts the HMN 10 via the telephone agent 54, the DTI 40' and the SS7 interface 42', and the MSC 18' and MSC 18. Alternatively, the voice path may use the IP network 36, in which case the dynamic call router 60' contacts the HMN 10 via the VOIP interface 50', the IP network interface 48', the IP network interface 48, and the VOIP interface 50.

The request for voice contact arrives at the DSP 58 either via the DTI 40 or via the VOIP Interface 50 (step 310). The DSP 58 extracts the CLI or mailbox address and password belonging to the mobile telephone 16 from the user profiles database 64 (step 312). Using the extracted information, the DSP 58 then contacts the VMS 26 via the telephone agent 54, thereby completing the voice path from the mobile telephone 16 to the VMS 26 (step 314).

The user listens to the voice mall messages over the voice path and performs additional voice mail functions such as reply, save, forward, etc. (step 316). The user operates these functions by dialing DTMF signals. According to a preferred embodiment of the present invention, the DTMF signals are captured by the service node 30', transferred over the IP network 36, and regenerated by the service node 30. When the user hangs up, the voice path is released (step 318).

Figure 8A:
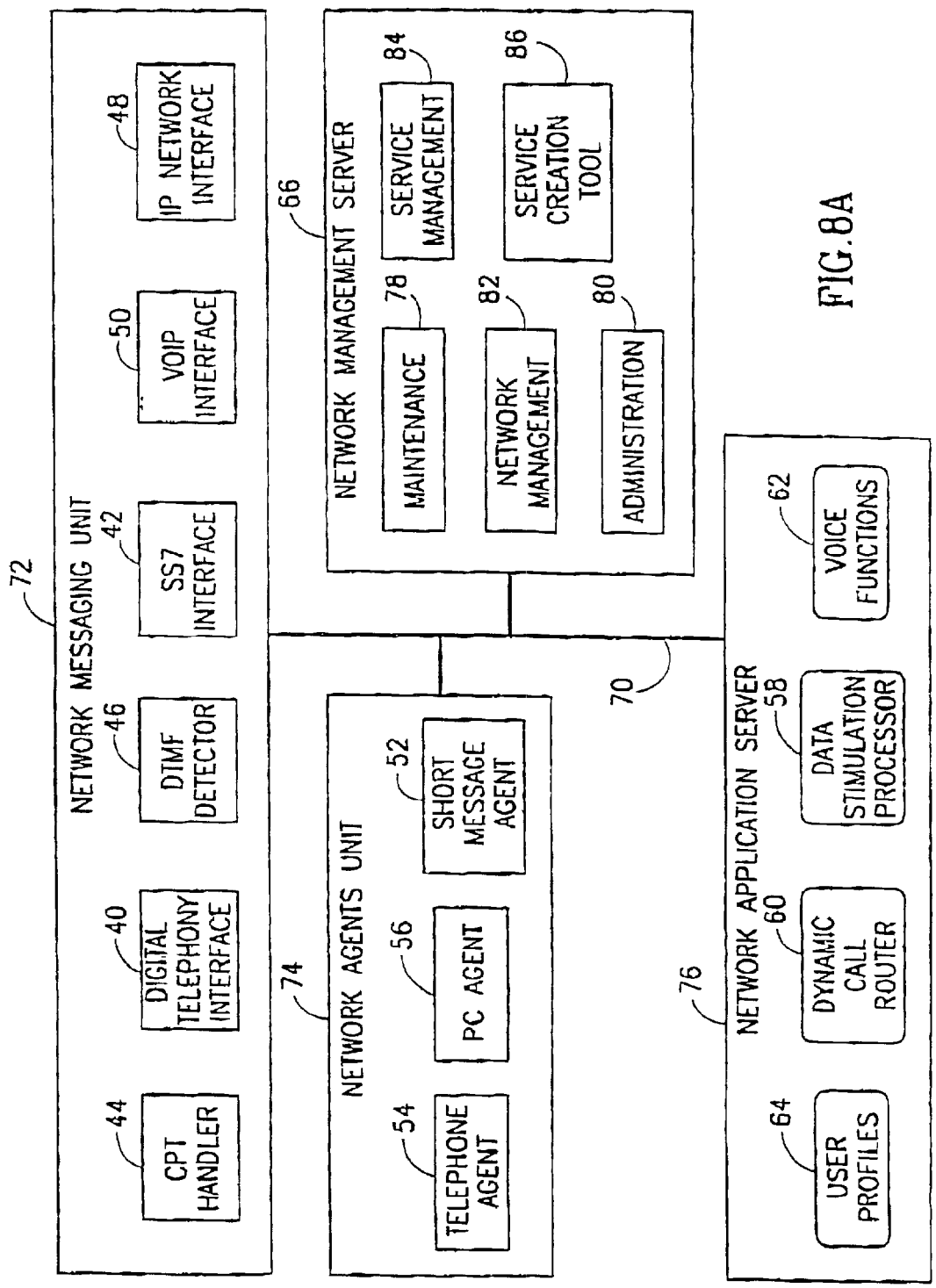
FIGS. 8A and 8B are schematic block diagram illustrations of service nodes, according to a preferred embodiment of the present invention.
Figure 8B:
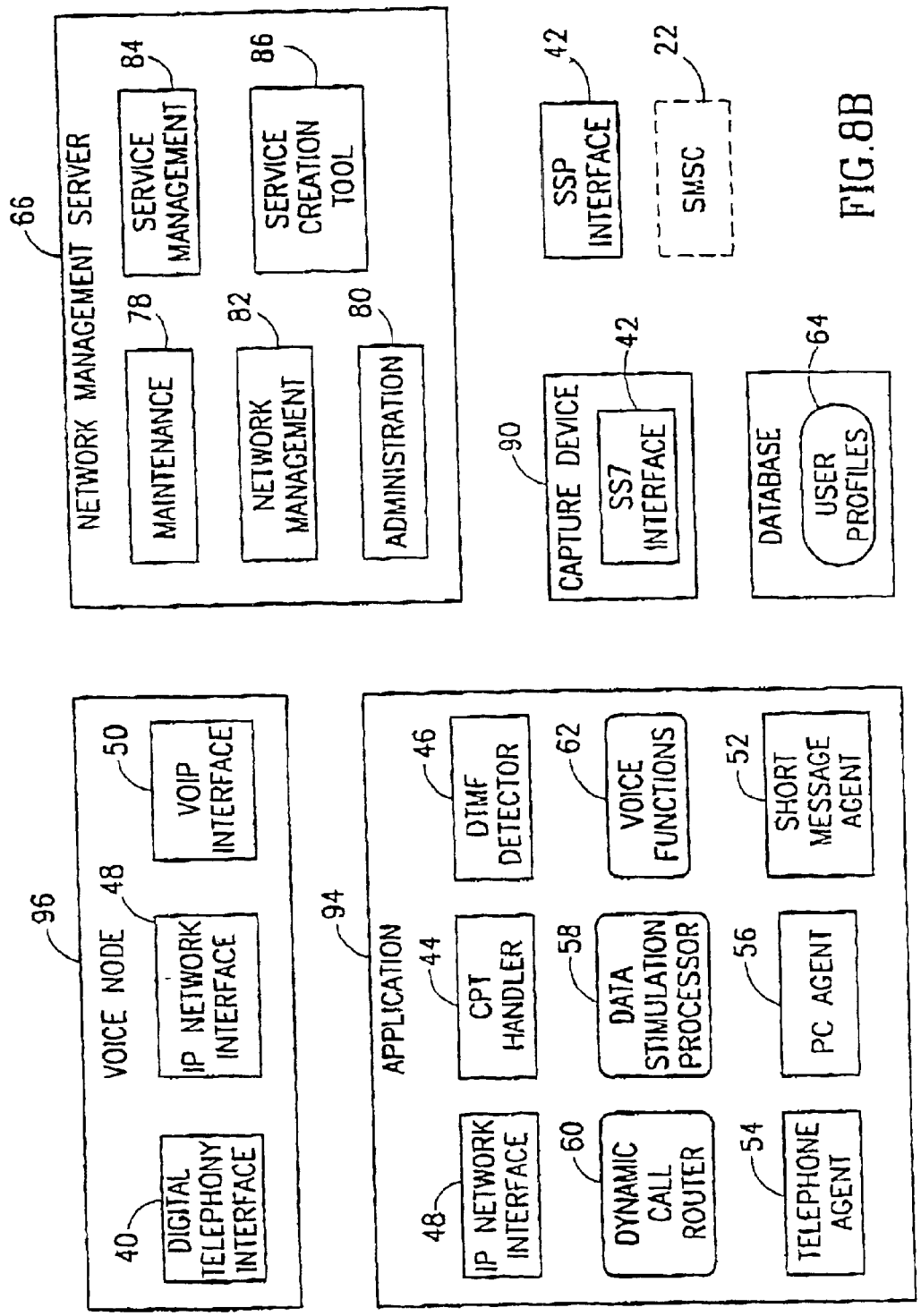

Reference is now made to FIGS. 8A and 8B, which are two alternate schematic block diagram illustrations of a service node, FIG. 8A shows how the components of the service node 30 could be arranged in order to form a distributed service node connected by a local area network (LAN) 70, according to a preferred embodiment of the present invention. The service node 30 comprises a network messaging unit 72, a network agents unit 74, a network application server 76, and the network management server 66. The network management server 66 comprises a maintenance unit 78, an administration unit 80, a network management unit 82, a service management unit 84 and a service creation tool 86.

The maintenance unit 78 performs ongoing maintenance of the system and network, including monitoring, statistics, alarms reporting and handling, etc. Display and monitoring functions may have a graphical user interface. A standard network management unit is used as infrastructure. The administration unit 80 manages the definition and update of the user profiles database 64, and produces billing reports of each user transaction message or call. The network management unit 82 maintains and updates the global network topology of service nodes and their profiles, as well as dealing with network security issues. The service management unit 84 controls the activation and deactivation of new services and the modification of service definitions. The service creation tool 86 is a software package for modifying the call flow of services.

FIG. 8B shows an alternate arrangement of the components of the service node 30, according to a preferred embodiment of the present invention. The service node 30 comprises the SS7 interface 42, a capture device 90, a database 92, an application unit 94, a voice node 96 and the network management server 66. The service node 30 may also include the SMSC 22. The application unit 94 contains the logic of the service node 30 and controls its operation. The voice node 96 is used to connect the service node 30 to voice lines.

In operation, the capture device 90 monitors and filters the output of a voice mail system connected to the service node 30. When the output contains a message waiting indication, the application unit 94 transfers the short message generated by the SMSC 22 via an IP network to the application unit 94' of another service node 30'. The application unit 94' transfers the short message to the SMSC 22' of the service node 30', and the SMSC 22' sends the short message via the mobile network connected to the service node 30 to a roaming mobile telephone.

It will be appreciated by persons skilled in the art that the present invention is not limited to voice mail services, rather it is applicable to all value added services whose signals or data can be transferred over a packet-switch network through a service node connected to a telephone network Examples of such value added services include, but are not limited to:

a) e-mail calls, in which users receive e-mall as a call to the mobile telephone even while roaming;

b) wireless access to corporate intranets and other data networks;

c) voice-based information and e-commerce services tailored to travelers in accordance with their home and visited countries and languages;

d) home dialing services while roaming; and e) fax services, using a specific cellular number as the fax gateway.

It will be appreciated by persons skilled in the art that the present invention is not limited by what has been particularly shown and described herein above, rather the scope of the invention is defined by the claims that follow.

What is claimed is:

1. A system for providing a roaming subscriber with access to services available in a first telephone network via a voice connection, said subscriber roaming in a second telephone network, the system comprising:

a first service node for association with said first mobile telephone network, a second service node for association with said second mobile telephone network, a packet-switch network for connecting said first service node with said second service node, said first and said second service nodes being configured to establish a signaling connection from said roaming mobile subscriber to a requested one of said services in said first mobile telephone network and to exchange signals required for said services between said first mobile network and said second telephone network via said packet switch network thereby to support said substantially seamless access, said signals comprising at least a subscriber identification signal to be transferred from said first telephone network to said second telephone network via said packet-switch network for reassociation with said voice connection whilst said voice connection is live.

2. A system according to claim 1, wherein said first telephone network is one of a group including: a mobile telephone network, a fixed telephone network, a Global System for Mobile communications (GSM) network, a Time Divisions Multiple Access (TDMA) network, a Code Division Multiple Access (CDMA) network, an IS-41 network, and a private branch exchange (PBX).

3. A system according to claim 1, wherein said second telephone network is one of a group including: a mobile telephone network, a fixed telephone network, a Global System for Mobile communications (GSM) network, a Time Division Multiple Access (TDMA) network, a Code Division Multiple Access (CDMA) network, an IS-41 network, and a private branch exchange (PBX).

4. A system according to claim 1, further comprising a passive System Signaling Number 7 (SS7) monitor for monitoring SS7 signals and triggering the provision of access to at least one of said services when one of a group of predetermined SS7 signals has been detected.

5. A system according to claim 4, wherein said predetermined SS7 signals are Mobile Application Part (MAP) messages.

6. A system according to claim 5, wherein said messages are from a group including: short messages and location updates.

7. A system according to claim 1, wherein:
said first service node is configured for transmitting said signals between said first telephone network and said packet-switch network; and
said second service node is configured for transmitting said signals between said packet-switch network and said second telephone network.

8. A system according to claim 7, wherein said second service node transmits dial tone multi-frequency (DTMF) signals substantially concurrently with the creation of a voice path connecting said first telephone network with said second telephone network, and said first service node synchronizes said DTMF signals with said voice path.

9. A system according to claim 7, wherein said subscriber uses a short code dependent upon the location of said subscriber to access said second service node.

10. A system according to claim 7, wherein said first service node instructs said second service node via said packet-switch network to generate and send a short message.

11. A system according to claim 7, further comprising:
a user profile of said subscriber, said user profile comprising at least a subscriber calling line identification (CLI),
wherein said subscriber CLI is required for access to said services.

12. A system according to claim 11, wherein said second service node receives said subscriber CLI from DTMF signals sent by said subscriber.

13. A system according to claim 11, wherein said second service node receives a second CLI from said second telephone network and said second CLI is associated with said subscriber CLI.

14. A system according to claim 11, wherein said second service node creates a voice path connecting said second telephone network with said first telephone network using a second CLI of said second service node, and wherein said first service node replaces with second CLI with said subscriber CLI when accessing one of said services.

15. A system according to claim 1, wherein said services include voice message notification.

16. A system according to claim 1, wherein said services include voice message retrieval.

17. A system according to claim 14, wherein said subscriber is enabled to use a short code dependent on the location of said subscriber to access said second service node.

18. A system according to claim 14, wherein said first service node is operable to instruct said second service node via said packet-switch network to generate and send a short message.

19. The system of claim 1, wherein said first mobile telephone network comprises any one of a group comprising a global system for mobile communications (GSM) network, a time division multiple access (TDMA) network, a code division multiple access (CDMA) network, an IS-41 network and a private branch exchange (PBX), and said second mobile telephone network comprises any other of said group.

20. The system of claim 1, wherein:
said first mobile telephone network comprises any one of a group comprising a global system for mobile communications (GSM) network, a time division multiple access (TDMA) network, a code division multiple access (CDMA) network, an IS-41 network and a private branch exchange (PBX),
said second mobile telephone network comprises any one of said group, but either one of said first mobile telephone network and said second mobile telephone network is not a GSM network.

21. A method for providing a roaming subscriber at a remote telephone network with access to services available in a first telephone network, the method comprising the steps of:
attaching a first node to said first telephone network, wherein a second node is connected to said remote telephone network, and
making a live voice connection between said roaming subscriber and a requested one of said services located in said first telephone network, and a signaling connection between said first and said second node using a packet-switch network, thereby to support transfer of a subscriber identifying signal between said roaming subscriber and said requested service via said packet-switch network for reassociation with said live voice connection to said services, thereby to render said at least one of said services available with voice operation to said roaming subscriber.

22. A method according to claim 21, wherein said first telephone network is one of a group including: a mobile telephone network, a fixed telephone network, a Global System for Mobile communications (GSM) network, a Time Division Multiple Access (TDMA) network, a Code Division Multiple Access (CDMA) network, an IS-41 network, and a private branch exchange (PBX).

23. A method according to claim 21, wherein said second telephone network is one of a group including: a mobile telephone network, a fixed telephone network, a Global System for Mobile communications (GSM) network, a Time Division Multiple Access (TDMA) network, a Code Division Multiple Access (CDMA) network, an IS-41 network, and a private branch exchange (PBX).

24. A method according to claim 21, further comprising the steps of:
monitoring SS7 signals; and
upon detection of one of a group of predetermined SS7 signals, triggering the provision of access to at least one of said services.

25. A method according to claim 24, wherein said predetermined SS7 signals are Mobile Application Part (MAP) messages.

26. A method according to claim 25, wherein said messages are from a group including: short messages and location updates.

27. A method according to claim 21, further comprising the steps of:
transferring dial tone multi-frequency (DTMF) signals over said packet-switch network;
substantially concurrently with said step of transferring, creating a voice path connecting said first telephone network with said second telephone network; and
synchronizing said DTMF signals with said voice path.

28. A method according to claim 21, further comprising the step of:
using a short code dependent upon the location of said subscriber to access one of said services.

29. A method according to claim 21, further comprising the step of:
accessing said services using a subscriber calling line identification (CLI) stored in a user profile of said subscriber.

30. A method according to claim 29; further comprising the step of receiving said subscriber CLI from DTMF signals sent by said subscriber.

31. A method according to claim 29, further comprising the step of receiving a second CLI from said second telephone network, wherein said second CLI is associated with said subscriber CLI.

32. A method according to claim 29, further comprising the steps of:
creating a voice path connecting said second telephone network with said first telephone network using a second CLI; and
replacing said second CLI with said subscriber CLI when accessing one of said services.

33. A method according to claim 21, wherein said services include voice message notification.

34. A method according to claim 21, wherein said services include voice message retrieval.

35. The method of claim 21, wherein said first mobile telephone network comprises any one of a group comprising a global system for mobile communications (GSM) network, a time division multiple access (TDMA) network, a code division multiple access (CDMA) network, an IS-41 network and a private branch exchange (PBX), and said second mobile telephone network comprises any other of said group.

* * * * *